United States Patent [19]
Rodgers

[11] 3,831,801
[45] Aug. 27, 1974

[54] PRESSURE-VACUUM VALVED CAP
[75] Inventor: Robert E. Rodgers, Connersville, Ind.
[73] Assignee: Stant Manufacturing Company Inc., Connersville, Ind.
[22] Filed: Nov. 20, 1972
[21] Appl. No.: 307,821

[52] U.S. Cl. .......... 220/39 R, 137/493, 220/24 GT, 220/44 R, 251/144
[51] Int. Cl... B65d 51/16, B65d 41/04, F16k 17/26
[58] Field of Search ..... 220/44, 24 C, 24 GT, 44 R, 220/39 R; 137/493, 493.3, 493.6, 493.9, 525, 526; 251/144

[56] References Cited
UNITED STATES PATENTS

| | | | |
|---|---|---|---|
| 2,179,292 | 11/1939 | Hanna | 137/493.9 |
| 2,735,443 | 2/1956 | Beck | 137/493.3 |
| 2,769,566 | 11/1956 | Thompson | 220/44 R |
| 3,138,173 | 6/1964 | Hartman | 137/493.8 |
| 3,343,707 | 9/1967 | DePen et al. | 220/44 R |
| 3,580,273 | 5/1971 | Schwarz | 137/525 |
| 3,603,343 | 9/1971 | Keller | 137/493.6 |
| 3,715,075 | 2/1973 | Blau et al. | 220/39 R |
| 3,724,708 | 4/1973 | Burgess | 220/44 R |

Primary Examiner—William I. Price
Assistant Examiner—Allan N. Shoap
Attorney, Agent, or Firm—Hood & Coffey

[57] ABSTRACT

A pressure-vacuum cap for a chamber having a filler neck, the cap comprising a housing proportioned and designed to engage and close the filler neck. The housing provides a passageway extending axially therethrough in communication with the filler neck and, intermediate the ends of the passageway, a concentric annular outwardly facing seat and a concentric annular inwardly facing seat. A gasket closes the passageway, the gasket having an outer peripheral portion in sealing engagement with one of said seats and an inner peripheral portion in sealing engagement with the other of said seats. Springs yieldably urge the gasket into sealing engagement with the seats. The springs are calibrated such that the gasket serves as a two-way valve for normalizing the pressure in such a chamber, venting the chamber to atmosphere when the pressure in the chamber exceeds a predetermined superatmospheric level and when the pressure in the chamber drops below a predetermined subatmospheric level.

8 Claims, 4 Drawing Figures

PRESSURE-VACUUM VALVED CAP

The invention relates to closure caps, and more particularly to the provision of a pressure-vacuum cap which serves as a two-way valve for normalizing the pressure in a chamber such as an automobile fuel tank, venting the chamber to atmosphere when the pressure in the chamber exceeds a predetermined superatmospheric level and when the pressure in the chamber drops below a predetermined subatmospheric level.

Pressure-vacuum valve caps are well known and such valve caps for closing fuel tanks are well known. The pressure-vacuum cap of the present invention is believed to be a significant improvement over such prior art devices.

Recently, great efforts, legislative and otherwise, have been directed toward reducing the air pollution characteristics of automobiles. The conventional vented gasoline tank of an automobile itself has been a polluter of the atmosphere. Venting of gasoline tanks is necessary to prevent the buildup of excessive superatmospheric pressures as well as to prevent excessive drops in pressure below atmospheric pressure. The acceptable solution to the problem, therefore, is to provide a calibrated two-way venting valve for a gasoline tank, i.e., a valve which will vent the tank to atmosphere when the pressure in the tank exceeds a predetermined and precise superatmospheric level as well as when the pressure in the tank drops below a predetermined and precise subatmospheric level. It appears to be desirable to put such a valve in the cap which closes the filler neck of the tank.

It is an object of my invention to provide such a cap which is inexpensive and quite simple in structure, yet extremely effective for the purpose intended.

Another object of my invention is to provide such a cap comprising a housing having a shank provided with an external thread proportioned and designed to engage the internal thread provided on a filler neck, the shank providing an axially extending passageway therethrough in which are disposed a specially-designed gasket, seal plates, a pressure spring, a vacuum spring, and a specially-designed concentric and axially extending insert which closes the outer end of the passageway. The insert provides an annular, inwardly facing valve seat and the shank provides a concentric, outwardly facing annular valve seat. The gasket is annular to provide an inner peripherally extending bead in sealing engagement with the inwardly facing seat and an outer peripherally extending bead in sealing engagement with the outwardly facing seat. The gasket is also provided with an intermediate annular flexure region which permits independent movement of either its outer or inner bead away from its associated seat. An O-ring provides the necessary seal between the housing and the lip of the filler neck. In the preferred embodiment, a shell covers the housing and is drivingly connected to the housing by a torque-limited driving connection which protects the O-ring.

Other objects and features of the invention will become apparent as this description progresses.

To the accomplishment of the above and related objects, this invention may be embodied in the forms illustrated in the accompanying drawings, attention being called to the fact, however, that the drawings are illustrative only, and that change may be made in the specific constructions illustrated and described, so long as the scope of the appended claims is not violated.

Figure 1:
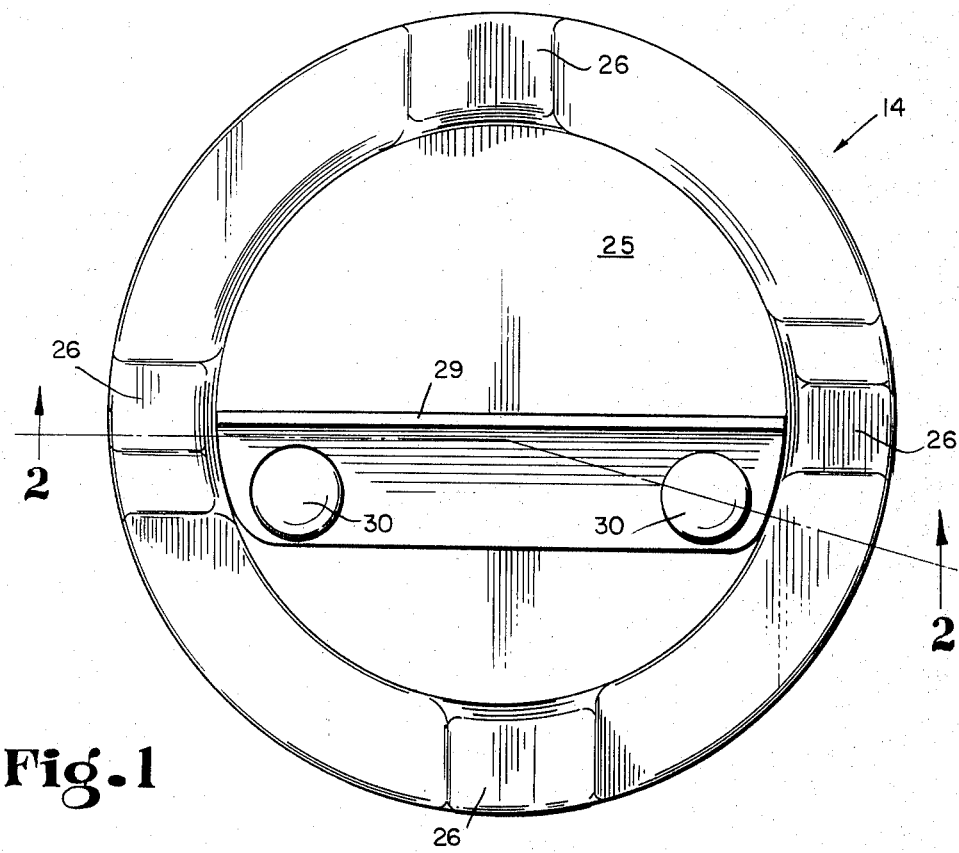
FIG. 1 is a plan view of a closure cap constructed in accordance with my present invention.

Referring now to the drawings, it will be seen that I have illustrated a filler neck indicated generally by the reference numeral 10 provided by a generally cylindrically-shaped shell 11 formed to provide, adjacent its outer end portion, an internal thread 12 and, at its outer portion, an outwardly turned lip 13. My cap, indicated generally by the reference numeral 14, for closing the filler neck 10 comprises a housing or housing member 16 formed to have, at its outer end portion, an outwardly and peripherally extending flange 17 and an axially inwardly extending shank 18 providing an external mating thread 19. The housing member 16 is also formed with a peripherally extending groove 20 adjacent the inner side of the flange 17 and in which is disposed an O-ring 22 proportioned and designed sealably to engage the lip 13 when the housing member is threaded into the filler neck to the position shown in FIG. 2.

Figure 3:
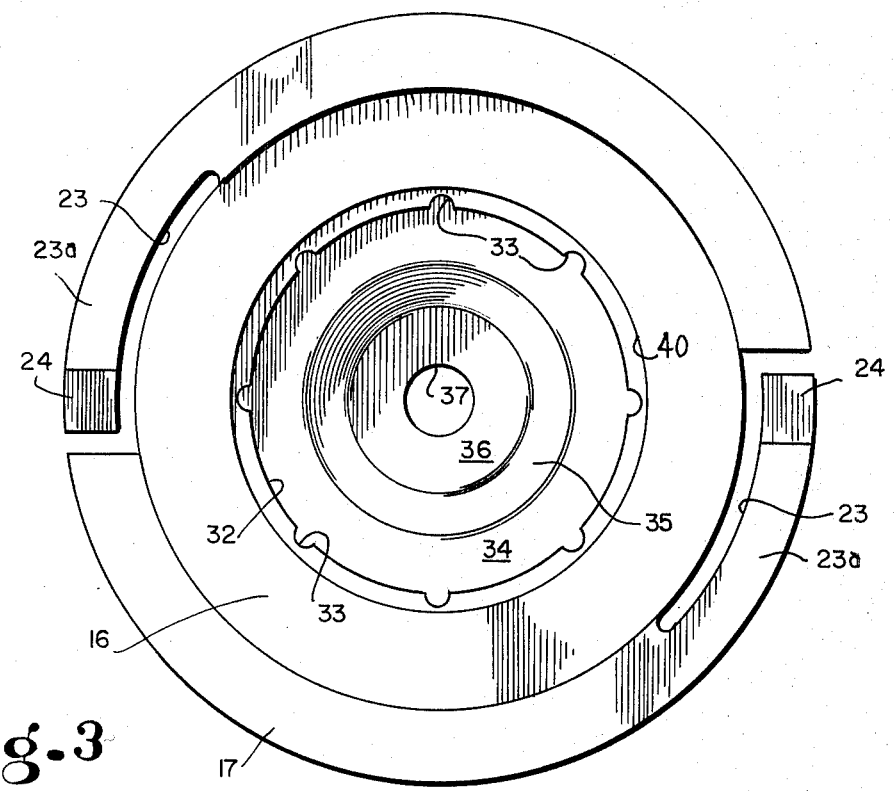
FIG. 3 is a plan view of the preferably plastic housing portion which provides the threaded shank which extends into the filler neck.

As best seen in FIG. 3, the flange 17 is formed with a pair of oppositely disposed peripherally extending slits 23 providing peripherally extending spring-like fingers 23a carrying at their distal ends locking lugs 24. A metal shell 25 covers the outer portion of the housing member 16, this shell providing four peripherally spaced apart pockets 26 for receiving the lugs 24. The engagement of the lugs 24 in the pockets 26 provides a driving connection between the shell 25 and the housing member 16, which driving connection is torque-limited to prevent damaging the O-ring 22 because the trailing end (clockwise end) of each pocket is a camming surface as discussed in a companion application Ser. No. 307,820 filed herewith by Mr. Dawson Friend. It will be appreciated that the useful life of the cap 14 will be extended by protecting the O-ring 22.

Figure 2:
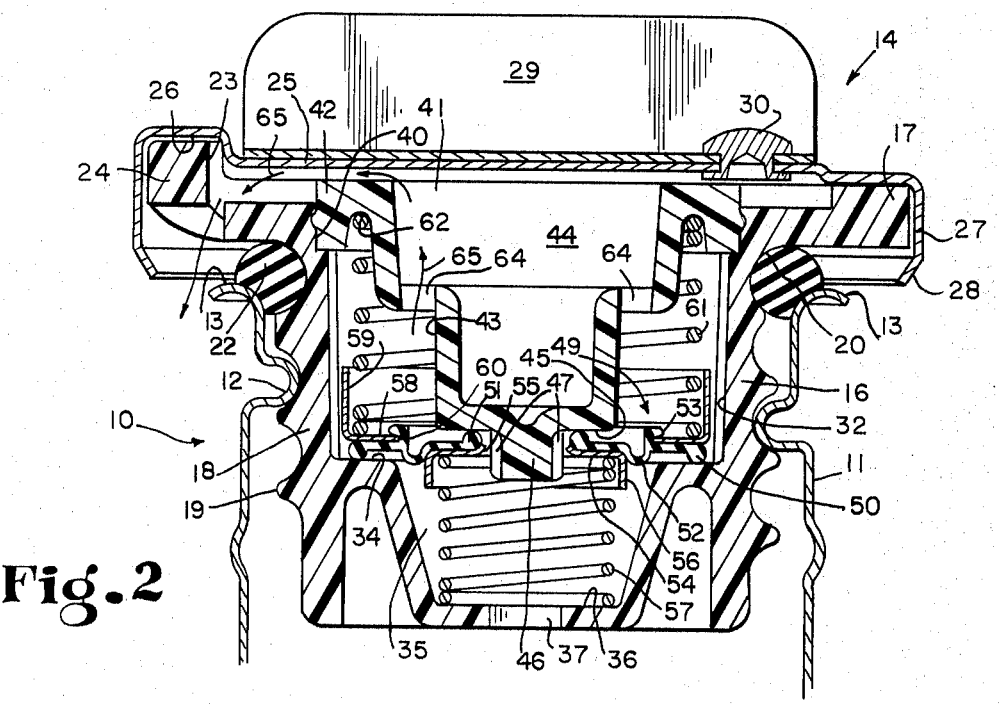
FIG. 2 is a sectional view taken from FIG. 1 generally along the lines 2—2.

In the embodiment of FIG. 2, the shell 25 is formed to have a peripheral depending skirt 27, the inner portion 28 of which is turned in to capture the flange 17 within the shell. An ear 29 is riveted to the upper surface or outer surface of the shell 25 as indicated at 30 to provide means for turning the shell, thereby turning the housing member 16.

As indicated previously, the shank 18 has a passageway extending axially therethrough. The outer, larger portion of this passagway is indicated at 32. As best seen in FIG. 3, this passageway portion 32 is concentric and axially inwardly extending. Peripherally spaced apart, axially extending grooves 33 are formed in the wall of the passageway 32 to provide passageways for venting air and gasoline vapors about the outer periphery of a seal plate to be discussed hereinafter.

The shank 18 provides a peripherally and inwardly extending, outwardly facing annular seat 34 at the inner end of the passageway portion 32. Then, the shank 18 provides, extending inwardly from the seat 34, a tapered portion 35 which terminates with an inwardly and peripherally extending spring seat 36 having a concentric vent opening 37 therein.

It will be seen that the outer end of the passageway portion 32 is provided with a rabbet 40. An insert 41 having a peripherally extending mounting flange 42 received in the rabbet 40 is provided, this insert having a shank portion 43 extending axially inwardly. The shank portion 43 may be hollow as indicated at 44. The shank portion 43 provides, spaced outwardly from the seat 34, a concentric annular inwardly facing seat 45 and a reduced portion 46 extending axially inwardly a short distance from the seat 45. For reasons which will become clear as this description progresses, this reduced shank portion 46 is provided with peripherally spaced apart, axially extending grooves as indicated at 47. The insert 41 may be secured in housing 16 by pressing flange 42 into rabbet 40 or by snapping the flange into the rabbet.

From the description thus far and from the drawings, it will be appreciated that the seats 34, 45 are concentric, annular seats lying in parallel planes perpendicular to the axis of the housing member 16 and of the passageway therethrough. The seat 45 has an outer diameter somewhat less than the inner diameter of the seat 34, and the seat 45 is spaced a short distance axially outwardly from the seat 34.

I provide gasket means for closing the passageway through the housing member 16, the gasket means being in sealing engagement with the outwardly facing seat 34 and the inwardly facing seat 45. In the illustrative embodiment, the gasket means includes an annular, flexible gasket or diaphragm 49 formed to provide an outer, peripherally extending bead 50 in sealing engagement with the seat 34 and an inner peripherally extending bead 51 in sealing engagement with the seat 45. The gasket 49 is also preferably provided with an intermediate, annular flexure region 52, i.e., a thin trough-like region in radial cross section about which the outer and inner peripheral portions of the gasket independently flex. The gasket 49 is also formed to provide an outwardly and peripherally extending flange portion 53 for a purpose to be discussed hereinafter.

I prefer to provide an annular seal plate 54 having a slightly upturned inner peripheral edge 55 and a downturned outer peripheral skirt 56. This seal plate 54 is disposed between the vacuum spring 57 and the inner peripheral portion of the gasket 49. The vacuum spring 57 is a coiled compression spring acting between the seal plate 54 and the spring seat 36. I also prefer to provide an annular seal plate 58 in engagement with the outer peripheral portion of the gasket 49. The illustrative seal plate 58 includes an outer, upturned peripherally extending flange 59. The inner, peripherally extending edge 60 of the seal plate 58 abuts against the gasket flange 53. As illustrated, this flange 53 may be provided with an outwardly and peripherally extending bead which provides a groove snugly receiving the edge 60.

The seal plate 58 is disposed between the pressure spring 61 and the outer peripheral portion of the gasket 49. The spring 61, which is a coiled compression spring, may be confined, at its upper end, in a concentric groove 62 formed in the mounting flange 42 of the insert 41.

The insert 41 is provided with a plurality of peripherally spaced apart venting apertures 64. When pressure in the gasoline tank becomes excessive, the bead 50 moves away from the seat 34 to permit air and vapors to move about the bead and through the apertures 64 and over the top of the insert 41 as indicated by the arrow 65. When an excessive vacuum condition exists in the tank, the bead 51 moves inwardly from the seat 45 to permit air to move past the bead 51, through the grooves 47 and the aperture 37 into the tank.

That is, the springs 57, 61 are calibrated such that, when the pressure builds up in the gasoline tank, the outer peripheral portion of the gasket 49 will be flexed upwardly against the tendency of the spring 61 to permit air and gasoline vapors to flow around the bead 50 to escape from the tank into the atmosphere. When the pressure within the tank falls significantly below atmospheric pressure, the inner portion of the gasket 49 will flex downwardly against the tendency of the spring 57 to permit air to flow inwardly past the bead 51.

The illustrative and preferred gasket 49 is a sort of flexible diaphragm having an intermediate flexure region 52 disposed between the outer peripheral rigid edge of the seal plate 54 and the inner peripheral rigid edge of the seal plate 58. It has been found that this specially-designed flexible gasket with the rigid seal plates 54, 58 and with the calibrated springs 57, 61 provide an ideal structure for controllably venting a gasoline tank.

It will be appreciated that the intermediate flexure region 52 is approximately only one-half the thickness of the adjacent outer and inner regions. For instance, the flexure region may be only 0.020 inch thick while the regions against the seal plates 54, 58 may be 0.040 inch thick. The beads 50, 51 may be, for instance, 0.080 inch in diameter while the diameter of the gasket 49 may be 1.250 inches. The drawings accompanying this application are generally to scale so that the relative sizes of the housing member 16 and insert 41 may be generally determined on the basis of the typical dimensions just provided.

One material from which the gasket 49 may be fabricated is a material specified as SAE J200E6BG 615A14B14F17Z1. This is, of course, a Society of Automotive Engineering (SAE) specification. The insert 41 may preferably be a plastic material such as DELRIN 100 or CELCON M-2504. The housing member 16 itself may be made from the same plastic material as the insert 41.

Figure 4:
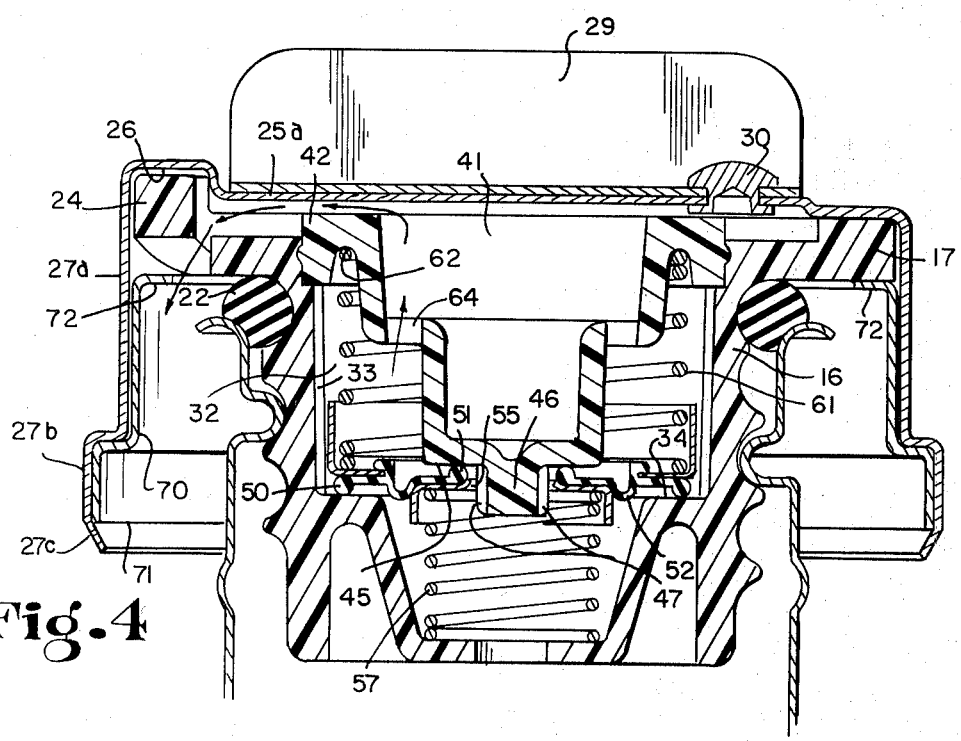
FIG. 4 is a sectional view similar to FIG. 2 except that it shows a cap having a different type of shell.

Turning now to FIG. 4, it will be seen that the illustrated shell 25a of that embodiment is formed to have a significantly axially longer skirt 27a, the distal end portion of which is enlarged as indicated at 27b and then turned inwardly as indicated at 27c. An inner shell 70 conformingly fits within the skirt portion of the shell 25a, the inner shell 70 having an inner peripherally extending edge 71 and, at its outer end, a peripherally and inwardly extending flange 72 capturing the mounting flange 17 of the housing member 16. The turned end portion 27c captures the inner shell 70 within the outer shell 25a. In all other essential respects, the embodiment of FIG. 4 is similar to the embodiments of FIGS. 1 and 2.

I claim:

1. A pressure-vacuum cap for a chamber having a filler neck formed with an internal thread and a peripherally extending lip, said cap comprising a molded plastic housing having an integrally molded shank provided with an integrally molded mating external thread, means for providing a seal between said housing and the neck, said shank providing a centrally disposed concentric passageway extending axially therethrough, an insert centrally disposed in said passageway, gasket means closing said passageway and having an outer peripheral portion engaging said housing and an inner peripheral portion engaging said insert, and yieldable means for holding said outer peripheral portion in sealing engagement with said housing and said inner peripheral portion in sealing engagement with said insert, said yieldable means and said gasket means being proportioned and designed to serve as a two-way valve means for normalizing the pressure in such a chamber, venting the chamber to atmosphere when the pressure in the chamber exceeds a predetermined superatmospheric level and when the pressure in the chamber drops below a predetermined subatmospheric level, said shank having an axially inner end portion and an axially outer end portion, said housing providing, adjacent said outer end portion, a peripherally and radially outwardly extending integrally molded plastic flange having axially outer and inner sides, and, adjacent said inner side, a peripherally extending generally radially outwardly opening groove in said shank, said means providing a seal between said housing and the neck including a sealing ring disposed in said groove and proportioned and designed sealably to engage the peripherally extending lip.

2. The invention of claim 1 in which said housing provides, in said passageway, a concentric peripherally and radially inwardly extending seat facing axially outwardly, said insert providing a concentric peripherally and radially outwardly extending seat facing axially inwardly, said gasket means including a flexible annular gasket formed to have an outer peripherally extending bead engaging said outwardly facing seat, an inner peripherally extending bead engaging said inwardly facing seat, and an intermediate annular flexure region permitting independent movement of said outer and inner portions, said flexure region being formed as a bight in radial cross section.

3. The invention of claim 2 in which said yieldable means includes calibrated pressure spring means for yieldably urging said outer bead against said outwardly facing seat and calibrated vacuum spring means for yieldably urging said inner bead against said inwardly facing seat, said insert being formed to provide a concentric peripherally and radially outwardly extending mounting flange portion and said housing being formed to provide, adjacent the axially outer end of its said passageway, a concentric peripherally extending axially outwardly facing rabbet for receiving said mounting flange portion, said insert being formed with ventilation openings therethrough spaced axially outwardly from its said inwardly facing seat, and means for securing said mounting flange portion in said rabbet.

4. The invention of claim 3 in which said insert is formed to provide a concentric outer shank portion extending axially inwardly from said mounting flange portion and terminating at its said inwardly facing seat and a concentric reduced inner shank portion extending axially inwardly from said seat, the axially inner end portion of said housing shank providing a spring seat, said pressure spring means including a compression spring coiled about said outer shank portion and acting between said mounting flange portion and said outer peripheral portion of said gasket, and said vacuum spring means including a compression spring coiled about said inner shank portion and acting between said spring seat and said inner peripheral portion of said gasket.

5. The invention of claim 1 in which said housing provides intermediate the axial ends of said passageway, a concentric peripherally and radially inwardly extending seat facing axially outwardly, said insert providing a concentric peripherally and radially outwardly extending seat facing axially inwardly, said gasket means including a flexible annular diaphragm formed to have a radially outer peripheral portion engaging said outwardly facing seat, a radially inner peripheral portion engaging said inwardly facing seat, and an intermediate annular flexure region permitting independent movement of said outer and inner portions, said flexure region being formed as a bight in radial cross section, said radially outer and radially inner portions having peripherally extending beads thereon engaging, respectively, said outwardly and inwardly facing seats.

6. The invention of claim 1 in which said housing provides intermediate the ends of said passageway, an annular and axially outwardly facing seat engaged by said outer peripheral portion of said gasket means, and said insert providing an annular and axially inwardly facing seat engaged by said inner peripheral portion of said gasket means.

7. The invention of claim 6 in which said gasket means includes an annular flexible gasket providing an outer peripherally extending bead engaging said outwardly facing seat and an inner peripherally extending bead engaging said inwardly facing seat, said gasket also providing an intermediate annular bight serving as a flexure region permitting independent movement of said outer and inner beads, said yieldable means including a coiled spring urging said outer bead against said outwardly facing seat and another coiled spring urging said inner bead against said inwardly facing seat.

8. The invention of claim 1 including a shell covering at least the axially outer end portion of said housing, said shell being rotatable relative to said housing about the axis of said shank, and means providing a driving connection between said shell and said housing, said driving connection means being torque-limited in the direction which advances said external thread in said internal thread to protect said sealing ring.

* * * * *